United States Patent
Surnilla

(10) Patent No.: US 10,337,416 B2
(45) Date of Patent: Jul. 2, 2019

(54) METHODS AND SYSTEMS FOR DETERMINING ENGINE MISFIRE

(71) Applicant: Ford Global Technologies, LLC, Dearborn, MI (US)

(72) Inventor: Gopichandra Surnilla, West Bloomfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1064 days.

(21) Appl. No.: 14/086,210

(22) Filed: Nov. 21, 2013

(65) Prior Publication Data

US 2015/0136080 A1   May 21, 2015

(51) Int. Cl.
| | |
|---|---|
| F02D 17/02 | (2006.01) |
| F02D 13/02 | (2006.01) |
| F02D 41/14 | (2006.01) |
| G01M 15/11 | (2006.01) |
| F02D 41/00 | (2006.01) |

(52) U.S. Cl.
CPC ..... *F02D 13/0249* (2013.01); *F02D 13/0261* (2013.01); *F02D 41/1448* (2013.01); *G01M 15/11* (2013.01); *F02D 41/0007* (2013.01); *F02D 41/009* (2013.01); *F02D 2041/001* (2013.01); *F02D 2200/1015* (2013.01); *F02D 2250/14* (2013.01); *Y02T 10/18* (2013.01)

(58) Field of Classification Search
CPC ............ F02D 13/0249; F02D 13/0261; F02D 41/1448; F02D 41/0007; F02D 41/009; F02D 2041/001; F02D 2200/1015; F02D 2250/14; G01M 15/11

USPC .................. 123/347, 674; 73/114.06, 114.03
See application file for complete search history.

(56) References Cited

U.S. PATENT DOCUMENTS

| | | | | |
|---|---|---|---|---|
| 3,277,874 A | * | 10/1966 | Wagner | F01L 1/245 123/90.16 |
| 3,403,663 A | * | 10/1968 | Wagner | F01L 1/245 123/90.16 |
| 3,965,677 A | * | 6/1976 | Goto | F01N 3/2053 60/277 |
| 4,040,294 A | * | 8/1977 | Matsuda | G01M 15/12 60/277 |
| 4,061,115 A | * | 12/1977 | Predhome, Jr. | F01L 1/047 123/90.16 |
| 5,109,825 A | * | 5/1992 | Joos | F02D 41/1448 123/479 |
| 5,193,513 A | * | 3/1993 | Marko | F02M 25/0777 123/481 |
| 5,559,285 A | * | 9/1996 | Bryant | G01M 15/11 123/406.27 |

(Continued)

FOREIGN PATENT DOCUMENTS

WO   9502174 A1   1/1995

*Primary Examiner* — David E Hamaoui
*Assistant Examiner* — Susan E Scharpf
(74) *Attorney, Agent, or Firm* — Julia Voutyras; McCoy Russell LLP

(57) ABSTRACT

Systems and methods for improving detection and mitigation of engine misfire are presented. Engine misfire is determined by sampling exhaust pressure of a cylinder only during a time when an exhaust valve of the cylinder is in an open state. If misfire is indicated, an actuator is adjusted to reduce the possibility of misfire during a subsequent cylinder cycle.

20 Claims, 4 Drawing Sheets

(56) References Cited

U.S. PATENT DOCUMENTS

| | | | | |
|---|---|---|---|---|
| 5,622,158 A * | 4/1997 | Katoh | ............... | F01N 13/12 |
| | | | | 123/406.44 |
| 5,682,867 A * | 11/1997 | Katoh | ............... | F01N 13/12 |
| | | | | 123/676 |
| 5,848,372 A * | 12/1998 | Ito | ............... | G01M 15/11 |
| | | | | 701/101 |
| 6,243,641 B1 * | 6/2001 | Andrews | ............... | G01M 15/08 |
| | | | | 123/436 |
| 6,651,490 B1 * | 11/2003 | Ceccarani | ............... | F02D 41/1448 |
| | | | | 73/114.74 |
| 6,938,598 B1 * | 9/2005 | Lewis | ............... | F02D 41/0002 |
| | | | | 123/179.1 |
| 7,213,550 B2 * | 5/2007 | Nishida | ............... | F01L 9/04 |
| | | | | 123/347 |
| 7,801,671 B1 * | 9/2010 | Pederson | ............... | G01M 15/11 |
| | | | | 701/111 |
| 7,899,608 B1 * | 3/2011 | Pederson | ............... | G01M 15/11 |
| | | | | 701/111 |
| 7,921,709 B2 * | 4/2011 | Doering | ............... | F02D 13/06 |
| | | | | 73/114.37 |
| 2010/0263639 A1 * | 10/2010 | Uhrich | ............... | F02D 41/0007 |
| | | | | 123/564 |
| 2011/0270505 A1 * | 11/2011 | Chaturvedi | ............... | F02D 41/1498 |
| | | | | 701/102 |

\* cited by examiner

METHODS AND SYSTEMS FOR DETERMINING ENGINE MISFIRE

FIELD

The present description relates to a system and methods for detecting and mitigating misfire in an internal combustion engine. The systems and methods may be applied to boosted or naturally aspirated engines.

BACKGROUND AND SUMMARY

An engine may misfire for a variety of reasons including a concentration of exhaust gas within a cylinder being greater than desired, an air-fuel mixture within a cylinder being too lean, and/or spark energy being less than desired. One way to determine whether or not a cylinder of an engine has misfired is by monitoring engine acceleration and deceleration. If the engine does not accelerate after a cylinder passes top dead center of its compression stroke and before a subsequent cylinder in the engine firing order passes top dead center of its compression stroke, it may be determined that an engine cylinder has misfired. However, it may be difficult to distinguish engine acceleration from combustion in a first cylinder from engine acceleration from combustion in a second cylinder at higher engine speeds because engine combustion events are spaced close in time. Consequently, it may not be possible to take misfire mitigating actions for the one cylinder that is exhibiting misfire without adjusting operating conditions of all cylinders. Therefore, cylinders that are adjusted and not misfiring may be operated less efficiently than is desired.

The inventor herein has recognized the above-mentioned disadvantages and has developed a method for operating an engine, comprising: opening and closing an exhaust valve of a cylinder during a cylinder cycle; and beginning sampling an exhaust pressure sensor in an exhaust passage of the cylinder after opening the exhaust valve during the cylinder cycle and ending sampling at or before closing the exhaust valve during the cylinder cycle; and adjusting operation of the cylinder in response to sampling the exhaust pressure sensor.

By sampling exhaust pressure of a cylinder only during exhaust valve opening of the cylinder, it may be possible to determine engine misfire in cylinders that are misfiring without indicating misfire in a cylinder that is not misfiring. Further, a peak pressure of an exhaust pressure pulse from a cylinder relative to average exhaust pressure may provide a higher signal to noise ratio than engine acceleration relative to an average engine speed. Consequently, an exhaust pressure based engine misfire detection system may provide fewer false positive indications of misfire.

The present description may provide several advantages. For example, the approach may provide improved engine misfire detection at higher engine speeds. Additionally, the approach may eliminate sources of noise, such as cylinder blow through, from exhaust pressure data so that a higher confidence in cylinder misfire may be provided. Further, the approach may provide for improved misfire control for individual cylinders.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
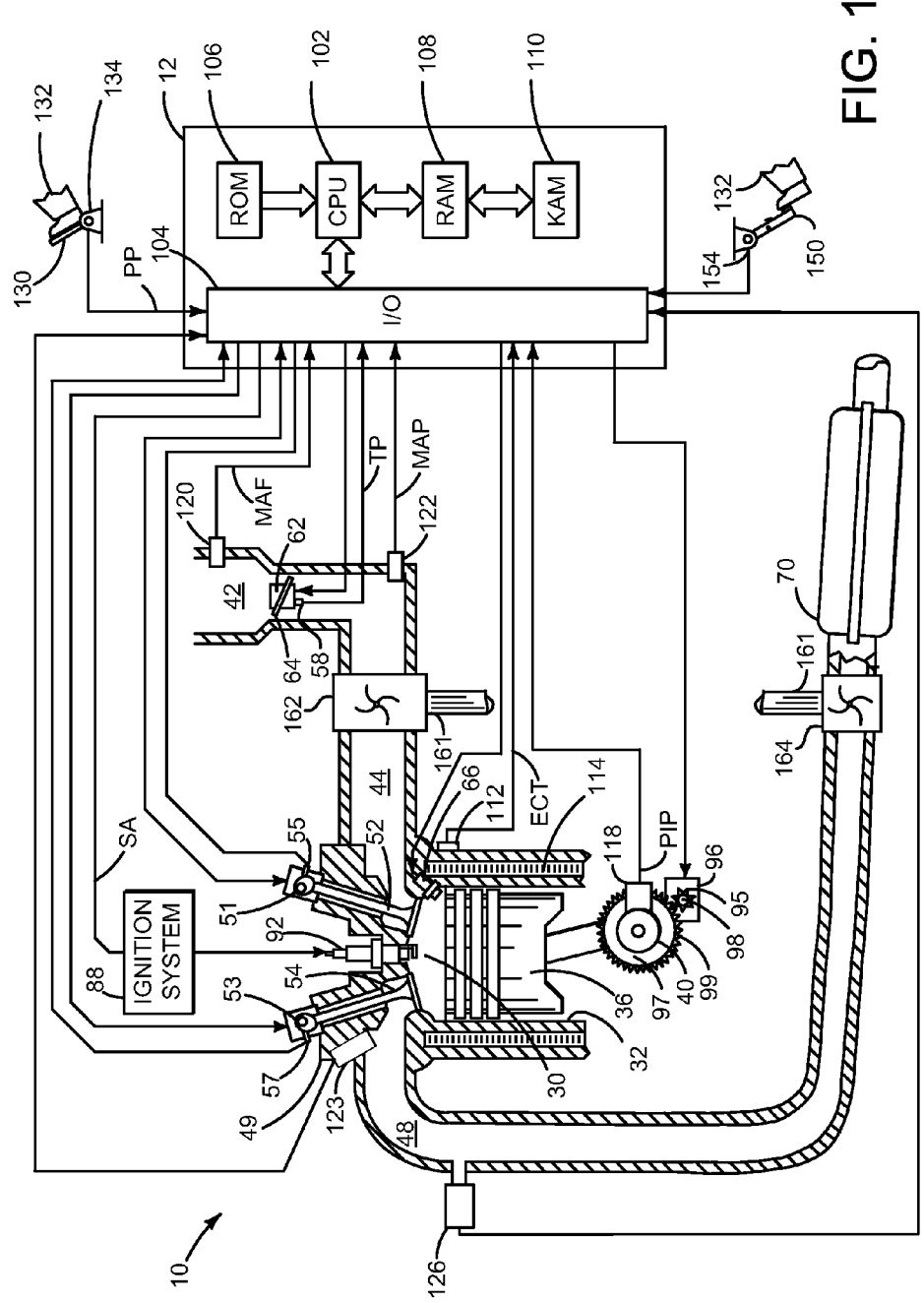
FIG. 1 is a schematic diagram of an engine.
Figure 2:
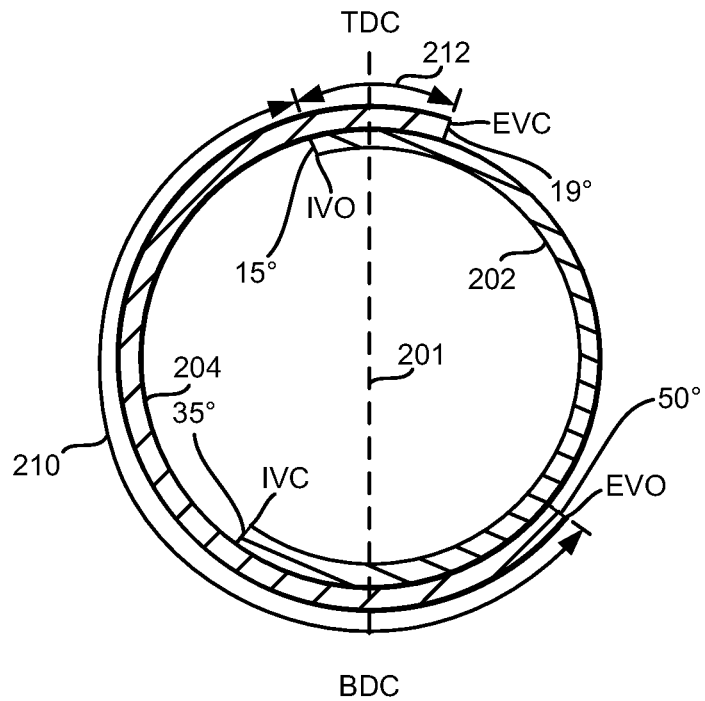
FIGS. 2 and 3 show different example valve timings for a cylinder.
Figure 3:
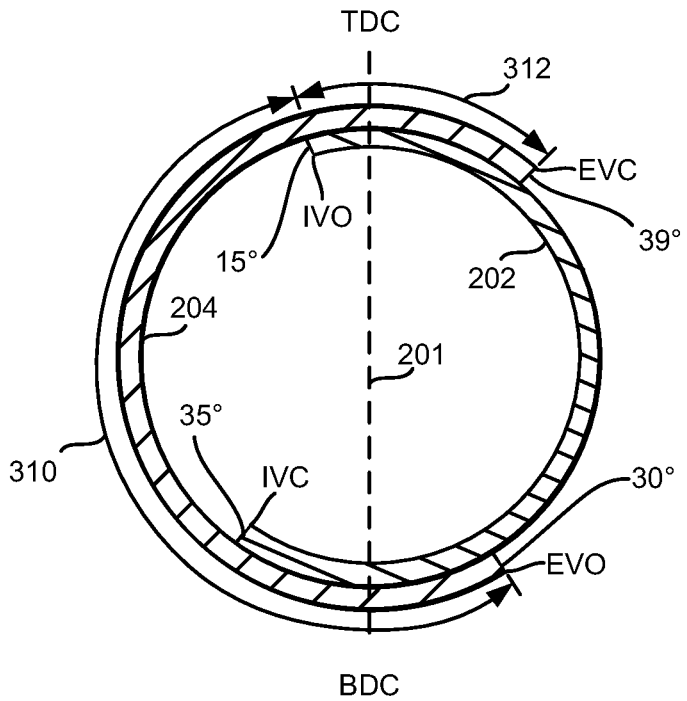

The present description is related to detecting and controlling misfire within an internal combustion engine. FIG. 1 shows an example engine system where misfire may be determined via an exhaust gas pressure sensor. Sampling of exhaust pressure of an engine cylinder is timed to reduce influence from exhaust pressure of other engine cylinders. Additionally, sample locations relative to crankshaft position are adjusted according to camshaft and/or exhaust valve timings relative to crankshaft position as shown in FIGS. 2 and 3. Exhaust pressure of a cylinder that misfires may be distinguished from exhaust pressure of a cylinder that does not misfire based on peak exhaust pressure and other features shown in FIG. 4. Finally, a method for determining cylinder misfire and reducing the possibility of subsequent misfires is shown in FIG. 5. Durations or locations expressed in degrees are in engine crankshaft degrees.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown).

In addition, intake manifold 44 is shown downstream of compressor 162 and optional electronic throttle 62. Compressor 162 is driven by force produced by exhaust gases impinging on turbine 164. Shaft 161 mechanically couples turbine 164 to compressor 162, thereby allowing turbine 164 to drive compressor 162 so that air at a positive pressure may be supplied to intake manifold 44. Electronic throttle 62 adjusts a position of throttle plate 64 to control air flow from air intake 42 to compressor 162 and intake manifold 44. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126. Exhaust pressure sensor 123 is positioned in an exhaust passage where exhaust gas exits cylinder 30. Exhaust pressure sensor 123 may be positioned within cylinder head 49 or in exhaust manifold 48.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a vehicle system, comprising: an engine including a cylinder; a pressure sensor positioned in an exhaust passage of the cylinder; an actuator to mitigate misfire in the cylinder; and a controller including non-transitory instructions executable to sample the pressure sensor only during exhaust valve opening of the cylinder and to not use samples collected during blow through conditions of the cylinder to adjust the actuator. The vehicle system further comprises additional instructions to determine a peak exhaust pressure during exhaust valve opening of the cylinder. The vehicle system further comprises additional instructions to operate the actuator in response to the peak exhaust pressure being less than a reference exhaust pressure. The vehicle system further comprises additional instructions to adjust exhaust valve opening time and exhaust valve closing time. The vehicle system includes where sampling the pressure sensor includes collecting a plurality of samples, and where a first sample of the plurality of samples is delayed a predetermined amount of time after exhaust valve opening.

Referring now to FIG. 2, a first circular valve timing diagram that illustrates exhaust pressure sampling timing is shown. The valve timings shown in FIG. 2 may be implemented in the system of FIG. 1, and the illustrated sampling times are according to the method of FIG. 5.

Inner ring 202 represents prophetic intake valve opening timing for the four stroke engine shown in FIG. 1. Outer ring 204 represents prophetic exhaust valve opening timing for the four stroke engine shown in FIG. 1. Top-dead-center (TDC) compression and exhaust positions are indicated at the top of vertical line 201. Likewise, bottom-dead-center (BDC) intake and expansion positions are indicated at the bottom of vertical line 201. Intake valve opening is denoted IVO, intake valve closing is denote IVC, exhaust valve opening is denoted EVO, and exhaust valve closing is denoted EVC. Thus, IVO occurs during the exhaust stroke and the intake valve remains open through the intake stroke until the early portion of the compression stroke. EVO occurs during the expansion stroke and the exhaust valve remains open until the early portion of the intake stroke. In this example, EVO is 50° before BDC exhaust stroke and EVC is 19° after TDC exhaust stroke. IVO is 15° before TDC intake stroke and IVC is 35° after BDC intake stroke, where degrees are crankshaft degrees.

According to the method of FIG. 5, the exhaust pressure sensor located in the exhaust port of a cylinder may be sampled during the time when the exhaust valve is open. In FIG. 2, the exhaust valve is open for duration 210 and duration 212. However, in some examples, exhaust pressure may not be sampled during intake and exhaust valve opening overlap period 212. During intake and exhaust valve overlap, exhaust pressure may rise if intake manifold pressure is greater than exhaust pressure. Thus, exhaust pressure may be influenced by the positive intake manifold pressure. The exhaust pressure sampling may be based on crankshaft position or time since the exhaust valve opened. If the sampling is crankshaft position based, exhaust pressure samples may be taken a predetermined number of crankshaft degrees apart. Alternatively, exhaust samples may be taken during duration 212 and then discarded or not used to determine integrated or peak exhaust pressures. Thus, in this example, exhaust pressure sensor sampling may be between 50° before BDC exhaust stroke and 19° after TDC exhaust stroke. Alternatively, in this example, exhaust pressure sensor sampling may be between 50° before BDC exhaust stroke and 15° before TDC intake stroke.

Referring now to FIG. 3, a second circular valve timing diagram that illustrates exhaust pressure sampling timing is shown. The valve timings shown in FIG. 3 may be implemented in the system of FIG. 1, and the illustrated sampling times are according to the method of FIG. 5. The inner 202 and outer 204 rings represent the same intake and exhaust valves as described in FIG. 2. However, in the second example of FIG. 3, exhaust valve timing has been retarded by 20° so that EVO is 30° before BDC exhaust stroke and EVC is 39° after TDC exhaust stroke. Additionally, the intake valve opening and exhaust valve opening overlap time is increased due to the exhaust valve timing retard. In particular, the overlap duration is increased from 34° to 54°. According to the method of FIG. 5, exhaust pressure may be sampled during duration 310 of FIG. 3. Further, exhaust pressure may be sampled or sampling may be ceased during duration 312 according to the method of FIG. 5. Therefore, in examples where sampling is ceased during overlap periods, the exhaust pressure sampling duration is reduced from a sampling window of 215° to 195° between the exhaust pressure sampling window (e.g., 210 and 212) shown in FIG. 2 and the exhaust pressure sampling window (e.g., 310 and 312) shown in FIG. 3.

Figure 4:
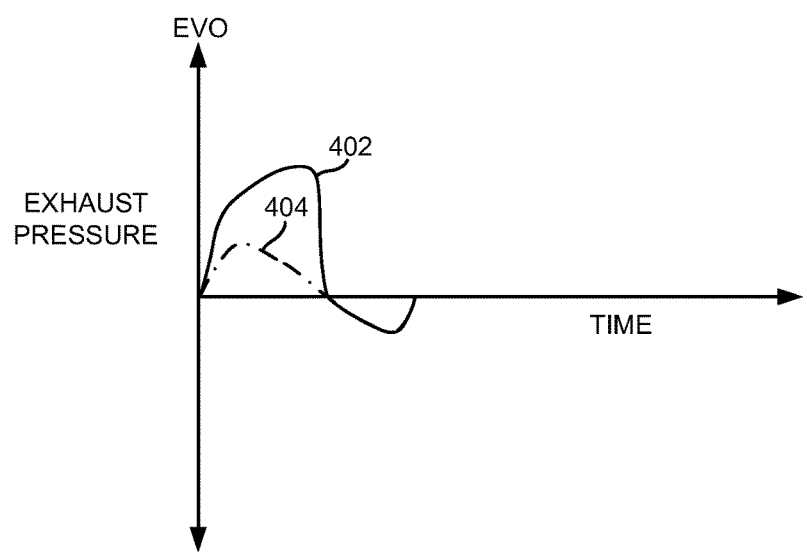
FIG. 4 shows an example prophetic cylinder exhaust pressure.
Figure 5:
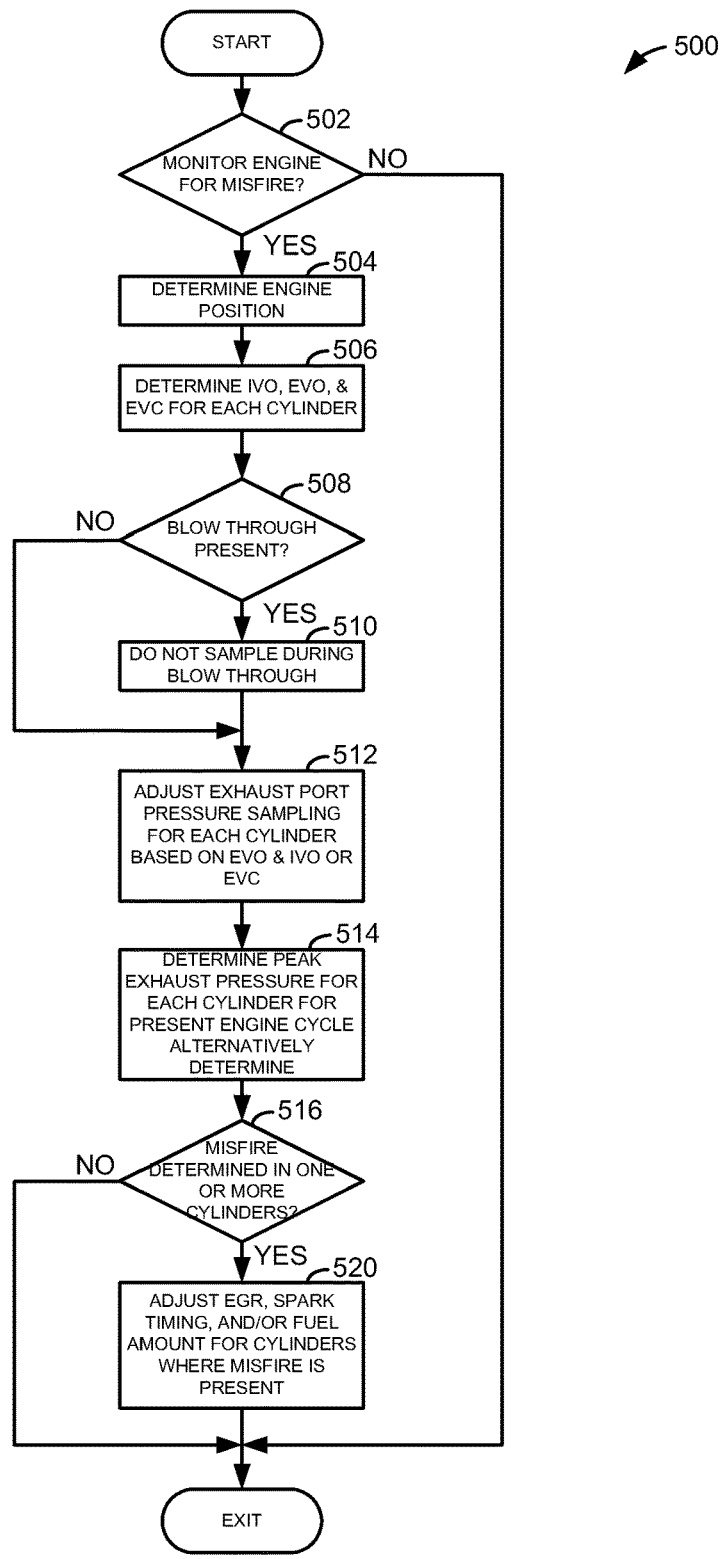
FIG. 5 shows an example method for detecting and mitigating engine misfire.

Referring now to FIG. 4, a plot of prophetic exhaust pressures is shown. The plot includes a vertical Y axis and a horizontal X axis. The Y axis represents exhaust pressure. Exhaust pressure increases positively in the direction of the arrow above the X axis. Exhaust pressure increases negatively in the direction of the arrow below the X axis. The X axis represents time and time increases from the left side of the plot to the right side of the plot.

Dash dot trace 404 represents exhaust pressure during exhaust valve opening for a cylinder that has misfired. Solid trace 402 represents exhaust pressure during exhaust valve opening for a cylinder that has not misfired. It may be observed that trace 402 has a higher peak pressure. Thus, an engine misfire during a cylinder cycle may be distinguished from the absence of misfire by peak exhaust pressure measured during exhaust valve opening. Additionally, it may be observed that an integral of trace 402 provides a larger positive value than an integral of trace 404. Therefore, an engine misfire during a cylinder cycle may be distinguished from the absence of misfire by an integral of exhaust pressure measured during exhaust valve opening of the cylinder being diagnosed for the presence or absence of misfire.

Referring now to FIG. 5, a method for determining the presence or absence of engine misfire is shown. The method of FIG. 5 may be included in the system of FIG. 1 as executable instructions stored in non-transitory memory.

At 502, method 500 judges whether or not to monitor an engine for misfire. In one example, engine misfire detection is initiated in response to a request to start the engine. Engine misfire detection may be continuously operative or it may be selectively deactivated. If method 500 judges to monitor engine misfire, the answer is yes and method 500 proceeds to 504. Otherwise, the answer is no and method 500 proceeds to exit.

At 504, method 500 determines engine position. In one example, engine position is determined via a crankshaft position sensor and a camshaft position sensor. The combination of crankshaft and camshaft position sensor allows the controller to determine where TDC cylinder number one compression stroke is as well as the strokes for the remaining engine cylinders. For example, the crankshaft position sensor may sense 59 teeth of a position wheel during one engine revolution. The cam sensor may output one pulse for three hundred and sixty degrees of crankshaft rotation for every two engine revolutions. The crankshaft teeth and the cam sensor pulse allow individual identification of positions of all engine cylinders. In other examples, the number of crankshaft teeth and camshaft pulses may be adjusted to allow faster identification of engine position. The engine position is updated as the engine rotates. Method 500 proceeds to 506 after engine position is determined.

At 506, method 500 determines intake valve opening (IVO) timing, exhaust valve opening timing (EVO), and exhaust valve closing (EVC) timing for each engine cylinder. In one example, method 500 indexes lookup tables or functions that output IVO, EVO, and EVC based on camshaft position relative to crankshaft position. Thus, camshaft position and crankshaft position index the tables and/or functions and IVO, EVO, and EVC are output. Method 500 proceeds to 508 after IVO, EVO, and EVC are determined.

At 508, method 500 judges whether or not cylinder blow through is present. In one example, intake manifold pressure is compared to exhaust pressure. If intake manifold pressure is greater than exhaust pressure and intake opening and exhaust valve closing overlap is present, method 500 may determine that blow through is present. If the intake and exhaust valve opening time overlap is short or if intake manifold pressure is only slightly higher than exhaust pressure, method 500 may determine blow through is not present. During blow through air from the intake manifold flows through the cylinder and enters the exhaust passage before the exhaust valve is closed. Air from the intake manifold may raise the exhaust pressure and degrade the possibility of distinguishing misfire from non-misfire conditions during some engine operating conditions. If method 500 judges that blow through is present, the answer is yes and method 500 proceeds to 510. Otherwise, the answer is no and method 500 proceeds to 512.

At 510, method 500 selects regions within exhaust valve opening of a cylinder being diagnosed for misfire to cease sampling. Alternatively, method 500 selects samples that are not to be included in the determination of whether or not the cylinder being diagnosed misfired. In one example, a portion or the entire intake and exhaust opening overlap region of a cylinder (e.g. number of crankshaft degrees) may not be sampled or the samples in this region may not be included in determining whether or not the cylinder misfired. For example, exhaust pressure for a cylinder may not be sampled or the samples may be disregarded to determine misfire in the cylinder during regions 212 and 312 shown in FIGS. 2 and 3. However, in some examples, the intake and exhaust opening overlap region may be sampled or used to determine misfire when engine intake manifold pressure is less than exhaust pressure so that exhaust pressure is not increased by intake manifold pressure.

Additionally, in some examples, a first portion of exhaust valve opening time of a cylinder beginning at EVO and extending a predetermined time from EVO may not be sampled or included in the determination of whether or not the cylinder misfired. By not sampling or disregarding the exhaust pressure samples in this region of exhaust valve opening time, conditions of sampling during choked flow from the cylinder may be avoided so that choked flow does not influence the misfire diagnostic. Method 500 proceeds 512 after method 500 judges a portion of exhaust valve opening time is not to be included in the determination of misfire.

At 512, method 500 adjusts exhaust port exhaust pressure sampling timing for each cylinder based on EVO and IVO or EVC. In one example, method 500 samples exhaust pressure in each exhaust port of each cylinder to determine misfire in each cylinder so that detection of misfire of one cylinder may have less possibility of being influenced by exhaust pressure from other engine cylinders. In one example, an exhaust pressure sensor for a cylinder is sampled at predetermined crankshaft angles or predetermined time intervals from EVO to EVC. In other examples, the intervals determined at 510 may be eliminated from sampling or processing of cylinder samples to increase the signal to noise ratio of the exhaust pressure for the cylinder being diagnosed for misfire. Thus, the exhaust pressure of a cylinder may be sampled beginning at EVO, or a predetermined time thereafter, until IVO or EVC. By not sampling during a portion of the intake and exhaust valve overlap time, it may be possible to improve the signal to noise ratio of the exhaust pressure signal for the cylinder being diagnosed for misfire. Exhaust pressure for the cylinder being diagnosed for misfire is not sampled or the samples are not used to determine misfire when the exhaust valve of the cylinder is closed. A plurality of exhaust pressure samples may be taken during exhaust valve opening time to provide an exhaust pressure profile for a cylinder being diagnosed for misfire.

Additionally, the beginning of exhaust pressure sampling is adjusted as exhaust cams or exhaust valve timing is varied. For example, if EVO is retarded by ten crankshaft degrees, beginning of sampling exhaust pressure for the cylinder being diagnosed for misfire is retarded by ten crankshaft degrees. Further, the reference pressure that is the basis for comparing exhaust pressure to is revised with exhaust valve timing variation. For example, a first exhaust pressure reference is the basis for comparing against actual exhaust pressure when the exhaust valve timing is not retarded. However, a second exhaust pressure reference is the basis for comparing against actual exhaust pressure when the exhaust valve timing is retarded five crankshaft degrees.

The exhaust pressure of a cylinder being diagnosed for misfire is sampled during exhaust valve opening at the determined timings or crankshaft angles. Exhaust pressure for each engine cylinder is sampled in a similar way.

Thus, during a first condition where blow through (e.g., air flows through the cylinder from the intake manifold and into the exhaust port during intake and exhaust valve overlap) is present, not sampling or not using samples of exhaust pressure from a cylinder being diagnosed for misfire during the intake and exhaust valve overlap period (e.g., from IVO to EVC). Thus, the effects of air blowing through the cylinder during exhaust pressure sampling on misfire determination may be reduced. During a second condition where blow through is not present, sampling during the intake and exhaust valve overlap period to determine exhaust pressure over the entire exhaust valve opening time. Sampling the exhaust pressure during the entire exhaust valve opening time may provide insight into the amount of EGR in the cylinder so that EGR may be reduced in a subsequent cylinder cycle if misfire is detected. Method 500 proceeds to 514 after exhaust pressure for engine cylinders is sampled.

At 514, method 500 determines peak exhaust pressure and other exhaust pressure attributes to determine misfire within engine cylinders. In one example, each sample of exhaust pressure of a cylinder being diagnosed for misfire is compared to other exhaust pressure samples taken during exhaust valve opening and the amount of the sample having the greatest value is determined to be the peak cylinder pressure. In other examples, two or more samples may be averaged to determine peak exhaust pressure for the cylinder being diagnosed for misfire.

In other examples, a plurality exhaust pressure samples for a cylinder being diagnosed for misfire may be integrated over the time the samples are taken (e.g., from EVO to IVO) to determine the integrated exhaust pressure. In still other examples, method 500 may determine the derivative of exhaust pressure between exhaust pressure samples to determine the rate of exhaust pressure rise. Method 500 proceeds to 516 after exhaust pressure attributes of cylinders being diagnosed for misfire are determined.

At 516, method 500 judges whether or not misfire is determined in one or more engine cylinders. In one example, peak exhaust pressure during exhaust valve opening is compared against a reference pressure to determine whether or not misfire is present in a particular cylinder. If the reference exhaust pressure is greater than the measured exhaust pressure, it may be determined that misfire is present in the cylinder. In other examples, the integrated exhaust pressure during exhaust valve opening of the cylinder being diagnosed for misfire is compared to a reference integrated exhaust pressure. If the reference integrated exhaust pressure is greater than the measured integrated exhaust pressure, it may be determined that the cylinder being diagnosed has misfired. Similarly, a rate of exhaust pressure rise may be compared to a reference rate of exhaust pressure rise. If the reference rate of exhaust pressure rise is greater than the measured exhaust pressure rise, it may be judged that the cylinder has misfired. If method 500 judges that one or more engine cylinders has misfired, the answer is yes and method 500 proceeds to 520. Otherwise, the answer is no and method 500 exits.

At 520, method 500 adjusts spark energy, exhaust gas recirculation (EGR) amount, and/or fuel amount for engine cylinders indicated to be misfiring. In particular, spark energy may be increased by increasing an ignition coil dwell time. Further, the EGR amount for the cylinder may be reduced and/or the air-fuel ratio of the cylinder may be richened to reduce the possibility of misfire. Method 500 proceeds to exit after actions are taken to adjust actuators to reduce the possibility of misfire in cylinders that are judged to be misfiring.

In this way, misfire for each engine cylinder may be determined from an exhaust pressure sensor positioned in an exhaust port of the cylinder. The cylinder's exhaust pressure may be sampled during selected periods of exhaust valve opening time of the cylinder.

Thus, the method of FIG. 5 provides for operating an engine, comprising: opening and closing an exhaust valve of a cylinder during a cylinder cycle; and beginning sampling an exhaust pressure sensor in an exhaust passage of the cylinder after opening the exhaust valve during the cylinder cycle and ending sampling at or before closing the exhaust valve during the cylinder cycle; and adjusting operation of the cylinder in response to sampling the exhaust pressure sensor during the cylinder cycle. The method further comprises capturing an exhaust pressure profile during exhaust valve opening and comparing the captured exhaust pressure profile against a reference exhaust pressure profile. The method further comprises adjusting spark energy supplied to the cylinder in response to an integral of the samples being greater than an integral of the reference exhaust pressure profile.

In some examples, the method further comprises increasing richness of an air-fuel ratio of the cylinder in response to a peak pressure indication from sampling the exhaust pressure during the cycle of the cylinder being greater than a peak pressure of the reference exhaust pressure profile. The method includes where sampling the exhaust pressure sensor includes providing a plurality of exhaust pressure sensor samples during the cylinder cycle. The method further comprises delaying a first sample of the plurality of exhaust pressure sensor samples a predetermined amount of time after exhaust valve opening. The method includes where the predetermined amount of time after exhaust valve opening is invariant with engine speed. The method further comprises not sampling the exhaust pressure sensor during blow through conditions in the cylinder.

The method of FIG. 5 also provides for a method for operating an engine, comprising: adjusting an opening and closing time of an exhaust valve of a cylinder; adjusting sampling of an exhaust pressure sensor in an exhaust passage of the cylinder to begin after opening the exhaust valve during a cylinder cycle and to end after closing the exhaust valve during the cylinder cycle; and adjusting operation of the cylinder in response to sampling the exhaust pressure sensor during the cylinder cycle. The method further comprises not sampling the exhaust pressure sensor during blow through conditions in the cylinder. The method further comprises not using samples collected during blow through conditions in the cylinder to adjust operation of the cylinder.

In one example, the method further comprises not sampling the exhaust pressure sensor during intake and exhaust valve overlap of the cylinder. The method further comprises not using samples collected during intake and exhaust valve overlap of the cylinder to adjust operation of the cylinder. The method further comprises determining a peak pressure and comparing the peak pressure to a reference pressure. The method further comprises adjusting operation of the cylinder when the reference pressure exceeds the peak pressure.

As will be appreciated by one of ordinary skill in the art, method described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
opening and closing an exhaust valve of a cylinder during a cylinder cycle;
operating the engine with blow through conditions present during the cylinder cycle;
sampling an exhaust pressure sensor in an exhaust passage of the cylinder during the cylinder cycle but not sampling the exhaust pressure sensor during the blow through conditions in the cylinder, where the blow through conditions include a condition where an intake valve of the cylinder is open while the exhaust valve is open and intake manifold pressure is greater than exhaust pressure;
determining peak exhaust pressure based on the sampling of the exhaust pressure sensor; and
adjusting operation of the cylinder in response to the peak exhaust pressure.

2. The method of claim 1, further comprising beginning sampling the exhaust pressure sensor after opening the exhaust valve during the cylinder cycle and ending sampling at or before closing the exhaust valve during the cylinder cycle and where sampling the exhaust pressure sensor includes capturing an exhaust pressure profile and where operation of the cylinder is adjusted based on a comparison of the captured exhaust pressure profile against a reference exhaust pressure profile.

3. The method of claim 2, where adjusting operation of the cylinder includes adjusting spark energy supplied to the cylinder in response to an integral of the samples being greater than an integral of the reference exhaust pressure profile.

4. The method of claim 2, where adjusting operation of the cylinder includes increasing richness of an air-fuel ratio of the cylinder when the peak exhaust pressure is greater than a peak exhaust pressure of the reference exhaust pressure profile.

5. The method of claim 1, where sampling the exhaust pressure sensor includes providing a plurality of exhaust pressure sensor samples during the cylinder cycle, the method further comprising delaying a first sample of the plurality of exhaust pressure sensor samples a predetermined amount of time after exhaust valve opening.

6. The method of claim 5, where the predetermined amount of time after exhaust valve opening is invariant with engine speed.

7. The method of claim 1, further comprising sampling the exhaust pressure sensor during exhaust valve and intake valve overlap when the intake manifold pressure is less than the exhaust pressure, and ending sampling at closing the exhaust valve during the cylinder cycle.

8. The method of claim 1, further comprising:
prior to beginning sampling, determining if blow through conditions are present based on an intake valve opening and an exhaust valve opening overlap duration and a comparison of the intake manifold pressure and the exhaust pressure; and
inhibiting sampling of the exhaust pressure sensor during the blow through conditions.

9. The method of claim 8, further comprising:
retarding exhaust valve timing; and
increasing a duration during which sampling of the exhaust pressure sensor is inhibited in response to retarding the exhaust valve timing.

10. The method of claim 1, further comprising:
capturing an exhaust pressure profile during exhaust valve opening when blow through conditions are not occurring;
determining a rate of pressure rise based on the exhaust pressure profile; and
comparing the rate of pressure rise against a reference rate of pressure rise;
where adjusting operation of the cylinder includes adjusting at least one of spark energy and fuel delivered to the cylinder based on the comparison between the rate of pressure rise and the reference rate of pressure rise.

11. A method for operating an engine, comprising:
adjusting an opening and closing time of an exhaust valve of a cylinder;
operating the engine with blow through conditions present;
adjusting sampling of an exhaust pressure sensor in an exhaust passage of the cylinder to begin after opening the exhaust valve during a cylinder cycle and to end at or before closing the exhaust valve during the cylinder cycle;
not sampling the exhaust pressure sensor during blow through conditions in the cylinder, where the blow through conditions include a condition where an intake valve of the cylinder is open while the exhaust valve is open and intake manifold pressure is greater than exhaust pressure;
determining peak exhaust pressure based on the sampling of the exhaust pressure sensor; and
adjusting operation of the cylinder in response to the peak exhaust pressure.

12. The method of claim 11, further comprising comparing the peak exhaust pressure to a reference exhaust pressure.

13. The method of claim 12, further comprising adjusting operation of the cylinder when the reference exhaust pressure exceeds the peak exhaust pressure.

14. The method of claim 11, where adjusting operation of the cylinder includes increasing spark energy delivered to the cylinder by increasing an ignition coil dwell time and ending sampling at closing the exhaust valve.

15. The method of claim 11, where adjusting operation of the cylinder includes increasing richness of an air-fuel ratio of the cylinder.

16. A vehicle system, comprising:
an engine including a cylinder;
a pressure sensor positioned in an exhaust passage of the cylinder;
an actuator to mitigate misfire in the cylinder; and
a controller including non-transitory instructions executable to operate the engine with blow through conditions present, to sample the pressure sensor only during exhaust valve opening of the cylinder, to not use samples collected during blow through conditions of the cylinder to adjust the actuator, to determine peak exhaust pressure based on the sampling of the pressure sensor, and to adjust operation of the cylinder in response to determining the peak exhaust pressure, where the blow through conditions include a condition where an intake valve of the cylinder is open while an exhaust valve of the cylinder is open and intake manifold pressure is greater than exhaust pressure in the exhaust passage.

17. The vehicle system of claim 16, further comprising not sampling the pressure sensor during conditions of choked flow from the cylinder.

18. The vehicle system of claim 17, further comprising additional instructions to operate the actuator in response to the peak exhaust pressure being less than a reference exhaust pressure.

19. The vehicle system of claim 16, further comprising additional instructions to adjust exhaust valve opening time and exhaust valve closing time.

20. The vehicle system of claim 16, where sampling the pressure sensor includes collecting a plurality of samples, and where a first sample of the plurality of samples is delayed a predetermined amount of time after exhaust valve opening.

* * * * *